US006443629B1

United States Patent
Novacoski et al.

(10) Patent No.: US 6,443,629 B1
(45) Date of Patent: Sep. 3, 2002

(54) TERMINUS BODY WITH TRAPPED SPRING

(75) Inventors: James Edward Novacoski, Yucaipa; Can Trong Nguyen, Garden Grove, both of CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/507,929

(22) Filed: Feb. 22, 2000

(51) Int. Cl.[7] .................................................. G02B 6/36
(52) U.S. Cl. .............................. 385/77; 385/70; 385/76; 385/55
(58) Field of Search ......................... 385/77, 78, 84, 385/76, 70–72, 59, 60, 66

(56) References Cited

U.S. PATENT DOCUMENTS

| 3,061,054 | A | | 10/1962 | Simmonds | 189/34 |
|---|---|---|---|---|---|
| 3,105,291 | A | | 10/1963 | Koeller | 29/227 |
| 3,162,938 | A | | 12/1964 | Koeller | 29/227 |
| 3,178,809 | A | | 4/1965 | Simmonds | 29/227 |
| 3,341,929 | A | | 9/1967 | Schwalm | 29/227 |
| 4,516,829 | A | * | 5/1985 | Borsuk et al. | |
| 4,725,117 | A | | 2/1988 | Ellis | |
| 4,735,480 | A | * | 4/1988 | Levinson et al. | |
| 4,787,701 | A | | 11/1988 | Stenger et al. | |
| 5,018,822 | A | | 5/1991 | Freismuth et al. | |
| 5,054,879 | A | | 10/1991 | Brown | 385/59 |
| 5,157,749 | A | | 10/1992 | Briggs et al. | 385/60 |
| 5,265,183 | A | | 11/1993 | Feng et al. | 385/78 |
| 5,283,848 | A | | 2/1994 | Abendschein et al. | 385/59 |
| 5,633,970 | A | | 5/1997 | Olson et al. | 385/78 |
| 5,712,938 | A | | 1/1998 | Lin et al. | 385/59 |
| 5,748,819 | A | | 5/1998 | Szentesi et al. | 385/60 |

FOREIGN PATENT DOCUMENTS

| DE | 93 08 395.5 | 9/1993 |
|---|---|---|
| DE | 43 43 063 A1 | 6/1994 |
| DE | 195 07 729 A1 | 9/1996 |
| DE | 195 33 498 A1 | 3/1997 |
| DE | 195 35 500 A1 | 3/1997 |
| DE | 297 09 602 U1 | 9/1997 |
| EP | 0 481 642 A2 | 4/1992 |
| EP | 0 928 978 A1 | 7/1999 |

* cited by examiner

*Primary Examiner*—Rodney Bovernick
*Assistant Examiner*—Michael J. Stahl
(74) *Attorney, Agent, or Firm*—Roger C. Turner

(57) ABSTRACT

An optical fiber terminus body has a helical spring (32) trapped between front and rear shoulders, with the rear shoulder formed by a thin flange (64) that facilitates mounting of the spring on a one-piece body (40). The thin flange has front and rear surfaces that are angled by no more than about 30° from a radial direction, and the base of the flange has an axial length substantially no greater than the radial length of the flange, to facilitate installation of the spring by turning the spring to thread it past the flange.

6 Claims, 3 Drawing Sheets

TERMINUS BODY WITH TRAPPED SPRING

BACKGROUND OF THE INVENTION

An optical fiber terminus commonly includes a terminus body with a shaft that holds a helical spring. Front and rear shoulders prevent loss of the spring, the rear shoulder being formed at the front surface of a rear flange. When mounted in a connector, the shaft is moved through a slot in a retaining plate, and thereafter the rear of the spring presses against a flat surface on the retaining plate. However, prior to mounting the terminus body, a manufacturer of the terminus body places the spring on the body to provide a unit ready for use by a buyer who will mount an optical fiber in the terminus, mount the terminus on the retaining plate, and install termini into a housing. The body must be constructed to hold the helical spring in place until it is mounted in an optical connector.

It can be a challenge to mount a helical spring on a shaft with shoulders at its opposite ends that retain the spring on the shaft. Previously, applicant constructed the shaft in two separate parts, with one part that forms the rear shoulder, being fixed to the rest of the body only after the spring was placed on the shaft. It would be possible to use a rear flange with a diameter only slightly greater than that of the shaft and to force the spring forwardly over the rear flange onto the shaft. However, this could result in the loss of the spring if it were pushed rearwardly off the flange. Also, the rear flange has an additional function of serving to mount the rear of the body onto a retaining plate, and for this purpose the flange should have a considerably greater outside diameter than the shaft. A one-piece terminus body that allowed mounting of a helical spring on the shaft that lies between the front and rear flanges while permitting a rear flange of large diameter, would be of value.

SUMMARY OF THE INVENTION

In accordance with one embodiment of the present invention, an optical fiber terminus is provided that includes a terminus body with a shaft that extends between a pair of shoulders and a helical spring that lies around the shaft between the shoulders, and a method for mounting the spring on the shaft, where the body is a one-piece part and the rear flange has a diameter considerably greater than that of the shaft. The front and rear surfaces of the rear flange each extend at an angle of no more than about 30° to a radial direction, as seen in a side view of the body. This allows the spring to be installed by turning it to thread it past the rear flange and onto the shaft.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
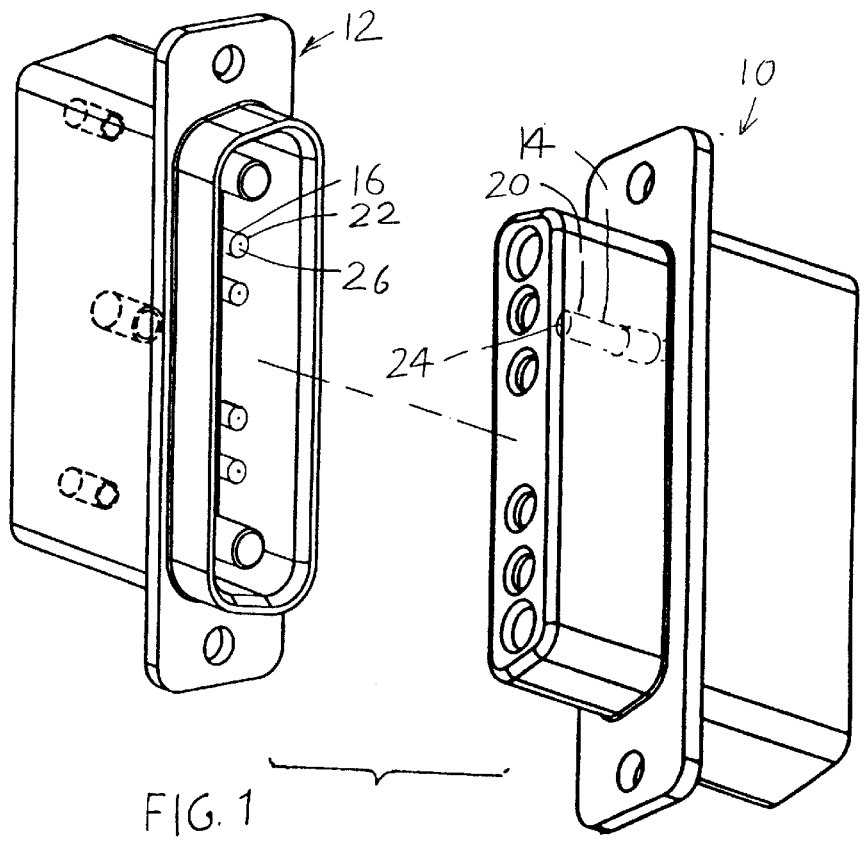
FIG. 1 is an exploded isometric view of first and second optical fiber connectors with termini constructed in accordance with the present invention.

FIG. 1 illustrates a pair of optical fiber connectors 10, 12 that each holds at least one optical fiber terminus 14, 16, the particular connectors shown each holding four termini. Each terminus includes a ferrule 20, 22 with a tip 24, 26. An optical fiber extends through each terminus, and has an optical fiber tip flush with a corresponding ferrule tip 24, 26. When the connectors are properly mated, the tips of the ferrules, and therefore the tips of the optical fibers, press against each other so light can pass from one optical fiber to the other.

Figure 2:
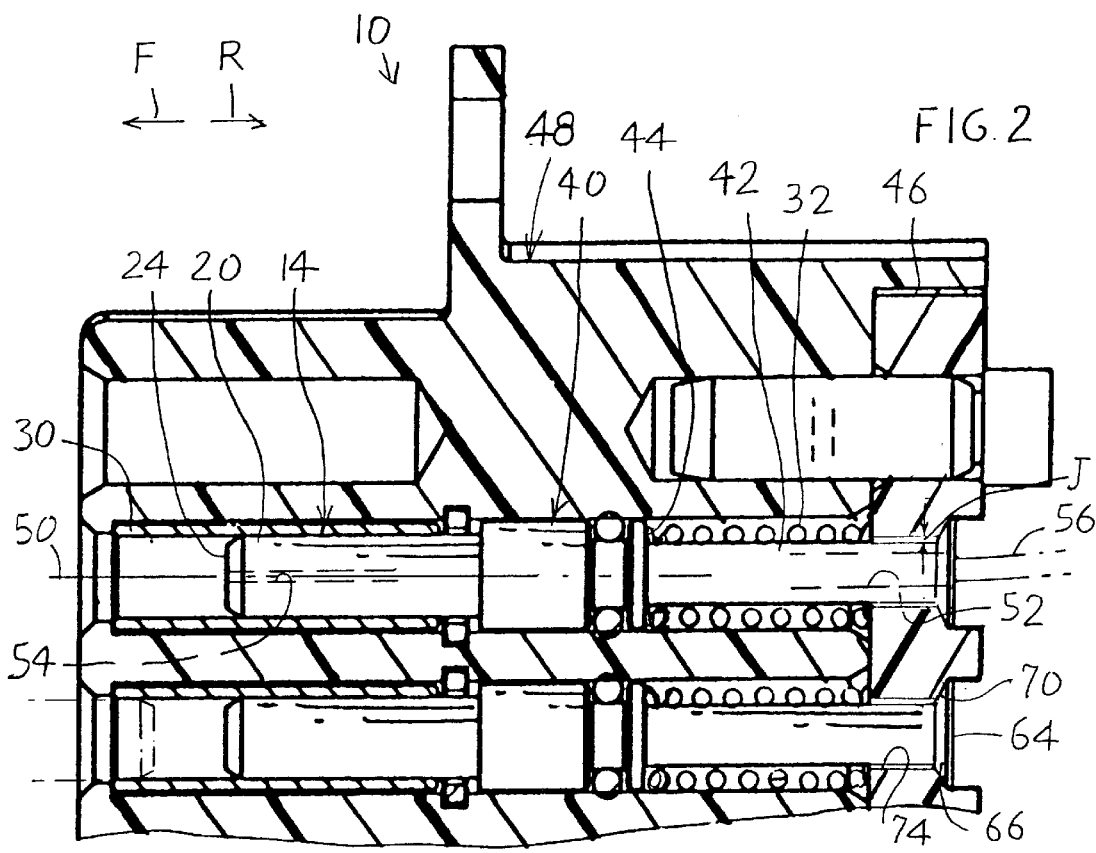
FIG. 2 is a partial sectional view of the first connector of FIG. 1.

FIG. 2 shows a portion of the first connector 10. The ferrule 20 of the terminus 14 lies in an alignment sleeve 30, which can receive the ferrule of the other connector. When the tips of the two ferrules meet, the terminus 14 is deflected rearwardly R against the force of a spring 32, the spring assuring that the tips of the ferrules are always firmly pressed against each other. The terminus includes a terminus body 40 that holds the ferrule 20. The terminus body is generally formed by machining it from metal such as stainless steel, with the ferrule 20 often formed of a ceramic or steel for high precision reception within the alignment sleeve 30. The body includes a shaft 42 around which the spring 32 lies. A rearwardly-facing front shoulder 44 abuts a front end of the spring. A retainer plate 46 of the first connector housing 48 abuts the rear end of the spring.

The terminus has an axis 50 and has a hole or passage 52 that extends along the axis. The ferrule 20 has a smaller diameter passage 54. An optical cable 56 extends through most of the length of the body passage 52, with the small diameter optical fiber extending through the ferrule passage 54 to the tip 24 of the ferrule. The cable and fiber are usually fixed in place with epoxy.

Figure 6:
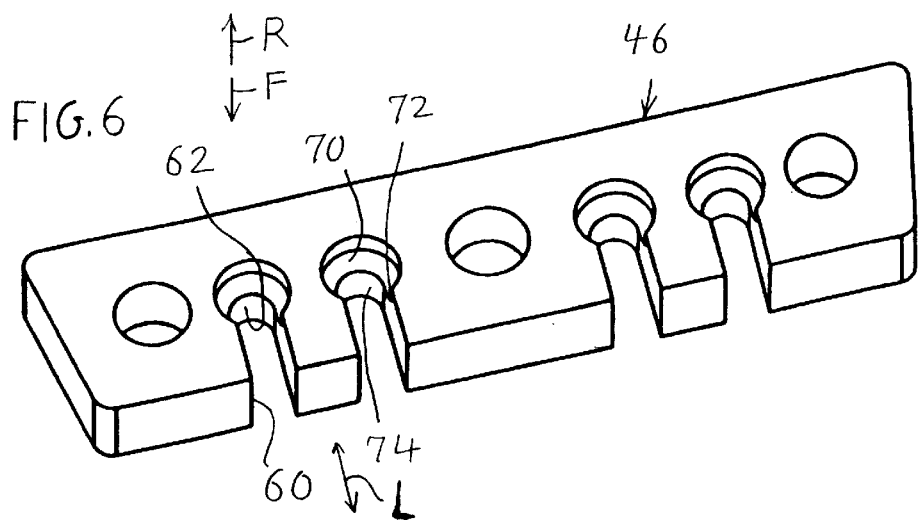
FIG. 6 is a rear isometric view of the retainer plate of the connector of FIG. 2.

After an optical cable is mounted in a terminus 14, the terminus is mounted on the retainer plate 46, whose rear surface is shown in FIG. 6. Each terminus is installed on the retainer plate by moving the terminus through a slot 60 in the plate, until the terminus reaches its final position at the end 62 of the slot. Referring again to FIG. 2, it can be seen that the terminus body has a thin rear flange 64 with a conical front shoulder 66 that rests in a conical recess 70 of the retainer's plate. FIG. 6 shows that the retainer plate forms the conical recess 70 at the rear end of the slot. The rear flange of the terminus body is prevented from moving laterally L out of the slot end by retaining surfaces 72 resulting from the conical recess 70 having a greater diameter than that of the slot. Thus, it is desirable to form the rear flange 64 (FIG. 2) with the conical forward shoulder 66 that helps keep the rear of the terminus nestled in the end of the slot of the retainer plate 46.

The terminus body is a one-piece part that is preferably formed from a machined piece of metal such as stainless steel, although it could be formed of other material. In the past, applicant constructed the rear flange 64, as a separate piece, so the helical spring 32 could be installed on the shaft 42, and then the flange 64 (with a post on it) could be installed on the rest of the terminus body. The need to form two separate pieces and fasten them, added to the cost and lowered reliability. Another possibility is to form the finished one-piece terminus body 40 and then install the helical spring 32 on the body. One way would be press the spring over the rear flange 64. However, this would require a rear flange having a diameter only slightly greater than that of the shaft 42, to avoid damage to the helical spring while expanding it to install it. If the rear flange 64 had a diameter only slightly greater than that of a shaft then it could not reliably hold the terminus body in the retainer plate 46. That is, there is a clearance J between the outside of the shaft 42 and the inside of the cylindrical portion 74 of the retaining plate. This allows the conical surface 66 of the rear flange to nest in the conical recess 70 in a retaining plate to position and retain in the terminus. As a result, the flange 64 is constructed with a considerably larger diameter than that of the shaft 42. This could make it difficult to install the spring on a one-piece terminus body.

Figure 3:
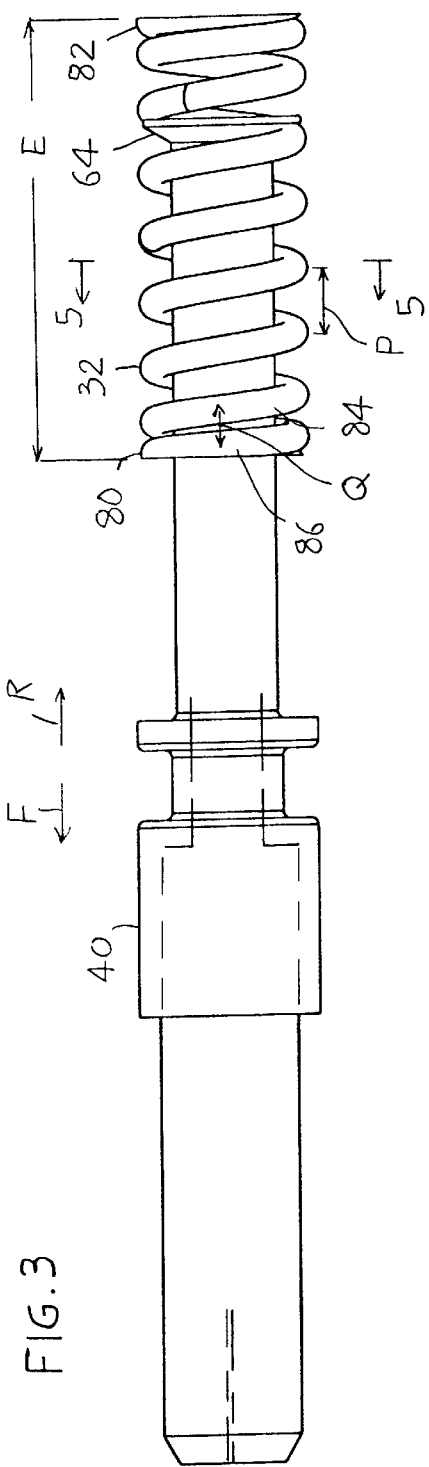
FIG. 3 is a side elevation view of a terminus of the first connector of FIG. 2, with the helical spring only partially installed thereon.
Figure 4:
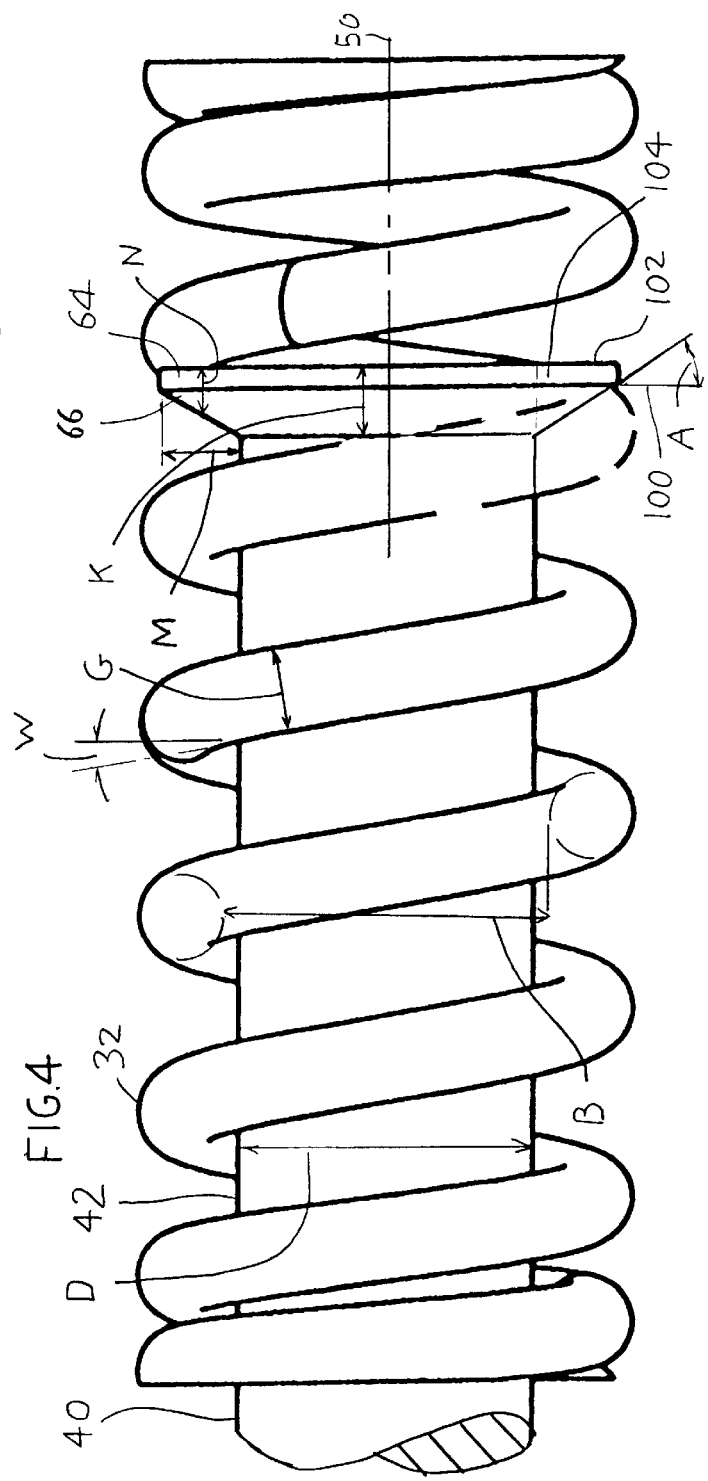
FIG. 4 is an enlarged view of the helical spring and a portion of the terminus body of FIG. 3.
Figure 5:
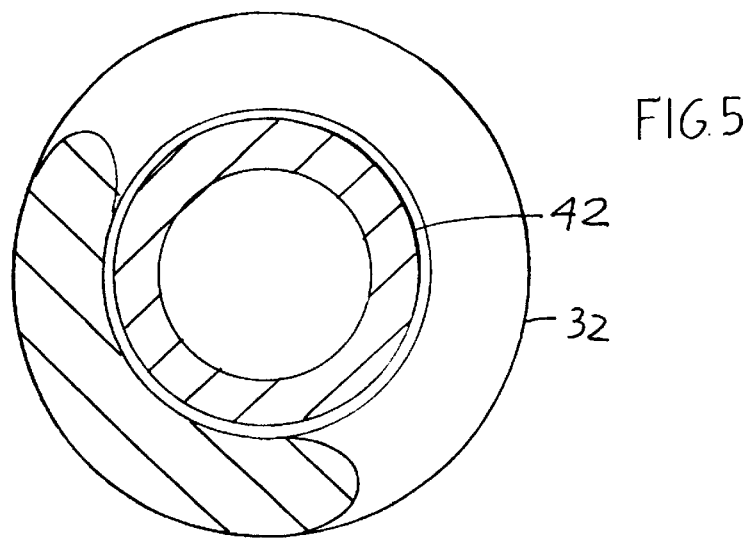
FIG. 5 is a view taken on line 5—5 of FIG. 3.

In accordance with the present invention, applicant uses a thin rear flange and installs the spring 32 on the shaft 42 by turning the spring to thread it past the thin rear flange 64. This requires proper construction of the flange 64 to permit such threading, for a rear flange of considerably greater diameter than that of the shaft 42. FIGS. 3 and 4 show the terminus body 40 and the helical spring 32 during installation of the spring on the body. In the figures, the spring is formed of wire that is wound in a clockwise-forward F direction. The spring can be thought of as a right hand thread. The spring can be threaded past the rear flange 64 by turning the spring clockwise so it advances past the flange 64 as though the flange 64 were a single turn of a screw thread. At the front and rear ends of the helical coil spring, the spring is closed and ground flat. That is, while a considerable pitch P exists between adjacent turns along most of the spring length, the two turns 84, 86 at each end have a much smaller pitch Q. Also, the end of the last turn 86 is ground flat so its face is geometrically normal to the axis of the spring. Such flatness at the ends avoids a tendency for the spring to skew the terminus body. The helix angle W such as 10° along most of the helical spring, is at least 10% greater than the helix angle at the end turns 84, 86.

Figure 7:
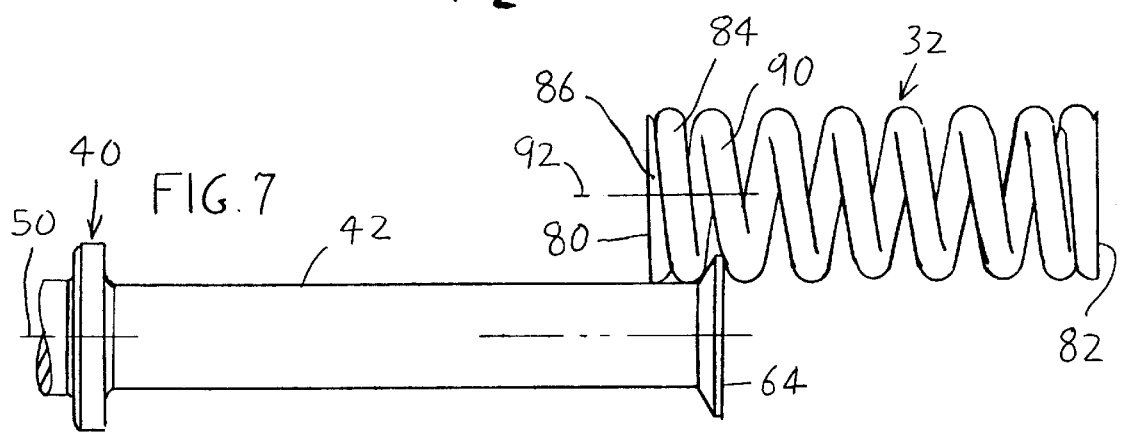
FIG. 7 is a partial side elevation view showing one step in the mounting of the helical spring on the shaft of the terminus body of FIG. 3.

FIG. 7 shows a first step for threading the spring 32 onto the shaft 42 of the body. A location between the second and third turns 84, 90 is placed to straddle the rear flange 64 as illustrated in the figure. Then the spring is rotated counter clockwise, when viewing the rear end 82, until the closed part between the first and second turns 84, 86 opens by straddling the flange 64. Then the spring is turned clockwise, while trying to align the axis 92 of the spring with the axis 50 of the body. This allows the closed end of the spring to pass through the flange 64. Clockwise turning of the spring continues until the spring lies completely on the shaft 42.

To facilitate threading of the spring onto the terminus body, the rear flange 64 must be thin, especially at its greatest diameter, or periphery. FIG. 4 shows details of the terminus body 40, including the rear flange 64, and the spring 32. Applicant constructs the thin rear flange 64 so its concave front shoulder or surface 66 extends at a relatively small angle A to a radial direction or line 100 that is perpendicular to the body axis 50. The angle A is preferably no greater than about 30° (i.e. it is less than 38°). Previously, applicant constructed the flange front surface 66 so the angle A was 45°, to help center the surface 66 within the cylindrical part of the slot end (62 in FIG. 6) in the retainer plate. The angle A should be at least 15° to perform the centering function.

Applicant's use of an angle A which is less than 38°, preferably less than 35°, and preferably 30°, provides reliable centering while providing a surface that can be easily threaded over. It is noted that the most common threads have a conical surface of 30° with respect to an axial line (and an included angle of 60°). The rear surface 102 is less than 30°, preferably less than 15°, and most preferably about 0°, as seen in FIG. 4. That is, the rear surface 64 makes an angle of about 0° to the radial direction such as the direction of line 100 (but shifted), or can even be concave. This is because such surface 102 helps allow the spring to thread past the rear flange 64. Applicant provides a largely cylindrical periphery at 104 to avoid a sharp edge that might cut someone, which increases the axial length K of the flange, and to resist stress and possible breakage at the flange.

The particular terminus body and spring of FIGS. 3 and 4 that applicant has designed are constructed with the shaft having a diameter D of 69 mils (1 mil=one thousandth inch) and a spring having an overall length E of 310 mils. The spring is formed of wire having a diameter G of 20 mils. The spring inside diameter B is 76 mils, and the spring outside diameter is 116 mils. The angle A is 30°. The flange periphery 104 has an axial length of 5 mils and an outside diameter of 106 mils. This results in a rear flange having an axial length K of 16 mils. The radial projection M of the flange beyond the periphery of the shaft is 18 mils. The average axial length N of the thin flange at a location halfway along its radial length M, is 12 mils, which is less than half, preferably less than one-third, and more preferably less than one fourth the shaft diameter D to facilitate spring installation.

It can be seen that the radial projection M of the flange is slightly greater than the axial length K of the flange. A reduction in radial extension M will make it easier to thread the spring onto the terminus body, but will make it more likely that the flange will pull through the retainer plate. Applicant prefers to have a radial projection M that is at least about ¼ of the diameter D of the shaft.

Thus, the invention provides an optical fiber terminus that includes a one-piece body and a largely helical spring lying on a shaft between front and rear shoulders, which facilitates mounting of the spring, as well as a method for mounting of the spring. The spring is mounted on the body by turning the spring while advancing it forwardly to thread it across the rear flange. The rear flange does not abut the spring in the final connector, but preferably has a conical surface to center it within a retaining plate. The angle of the conical taper is reduced from a prior 45° to a present angle of about 30° to facilitate threading the spring past the rear flange. Most of the axial length of the rear flange is taken by the conical surface having an incline angle of no more than about 30°, with preferably a short largely cylindrical periphery. The rear face of the rear flange preferably does not project rearwardly beyond the periphery as seen in a side view.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber terminus for mounting on a retention plate that has a hole with a tapered rear surface, comprising:
   a one-piece terminus body which is elongated along an axis, said body having a forward portion forming a largely rearwardly-facing front shoulder and a rearward portion forming a largely forwardly-facing rear shoulder with said body having a shaft of predetermined outside diameter extending between said shoulders;

a substantially helical spring lying around said shaft and between said shoulders;

said body rearward portion forming a thin flange having an average thickness that is less than half the shaft diameter, said flange having a forward surface forming said rear shoulder, with said forward surface extending radially inward and forward at an angle of at least 15° to a radial direction, to thereby enable the forward surface to center itself on the tapered rear surface of the retention plate while facilitating spring installation on the shaft.

2. The optical fiber terminus described in claim 1 wherein:

said thin flange has a rear flange end of an outside diameter greater than said shaft diameter, with said rear flange end having a rear surface extending at an angle of less than 15° to a radial direction as seen in a side view.

3. The terminus described in claim 1 wherein:

said helical spring has an outside diameter, and said thin flange has a periphery of a diameter at least 75% of said spring outside diameter.

4. The terminus described in claim 1 wherein:

said thin flange forward surface extends at an angle of less than 38° to a radial direction.

5. An optical fiber terminus, comprising:

a terminus body which is elongated along an axis, said body having a forward portion forming a largely rearwardly-facing front shoulder and a rear portion forming a flange with a largely forwardly-facing rear shoulder, with said body having a shaft extending between said shoulders;

a substantially helical spring lying around said shaft and between said shoulders;

said front shoulder is angled by about 30° to a radial direction while said rear shoulder is angled by about 0° to the radial direction.

6. An optical fiber terminus, comprising:

a terminus body which is elongated along an axis, said body having a forward portion forming a largely rearwardly-facing front shoulder and a rearward portion forming a largely forwardly-facing rear shoulder, with said body having a shaft extending between said shoulders;

a substantially helical spring lying around said shaft and between said shoulders;

said rearward portion forming a flange that said helical spring can be threaded past, said flange having a forward surface forming said rear shoulder, said flange also having a rearward surface, with said forward and rearward surfaces each extending at an angle to a radial direction to act like a thread which the helical spring can be threaded past;

said flange forward surface extends at an incline of substantially 30° to a radial direction while said rearward surface extends substantially normal to said axis.

* * * * *